(12) United States Patent
Balbo Di Vinadio et al.

(10) Patent No.: US 8,574,047 B2
(45) Date of Patent: Nov. 5, 2013

(54) AIR-EXCHANGE DEVICE FOR BUILDINGS

(75) Inventors: Aimone Balbo Di Vinadio, Chiusa San Michele (IT); Mario Palazzetti, Chiusa San Michele (IT)

(73) Assignee: Savio S.p.A., Chiusa San Michele (Torino) (IT)

( * ) Notice: Subject to any disclaimer, the term of this patent is extended or adjusted under 35 U.S.C. 154(b) by 458 days.

(21) Appl. No.: 13/024,173

(22) Filed: Feb. 9, 2011

(65) Prior Publication Data

US 2011/0195654 A1   Aug. 11, 2011

(30) Foreign Application Priority Data

Feb. 10, 2010 (IT) .............................. TO2010A0093

(51) Int. Cl.
*F24F 7/06* (2006.01)
*B60H 1/00* (2006.01)
*F24F 7/00* (2006.01)
*F25D 17/06* (2006.01)

(52) U.S. Cl.
USPC ................ 454/252; 165/59; 454/241; 62/426

(58) Field of Classification Search
USPC ..................... 454/252, 241; 165/59; 62/426
See application file for complete search history.

(56) References Cited

U.S. PATENT DOCUMENTS

| 6,401,802 B2 * | 6/2002 | Cottingham ..................... 165/54 |
| 2001/0036541 A1 * | 11/2001 | Makino et al. ................ 428/210 |
| 2008/0156454 A1 * | 7/2008 | Kim et al. ........................ 165/59 |

FOREIGN PATENT DOCUMENTS

| DE | 3208392 A1 | 9/1983 |
| DE | 19534842 A1 | 3/1997 |
| DE | 29906375 U1 | 6/1999 |
| EP | 2107203 A1 | 10/2009 |
| WO | 2005038355 A1 | 4/2005 |

OTHER PUBLICATIONS

Italian search report for Italian patent application No. IT TO20100093, dated Oct. 7, 2010.

* cited by examiner

*Primary Examiner* — Steven B McAllister
*Assistant Examiner* — Helena Kosanovic
(74) *Attorney, Agent, or Firm* — Patterson & Sheridan, L.L.P.

(57) ABSTRACT

An air-exchange device for buildings, designed to be installed between an internal environment and an external environment, comprising, a casing having a substantially flattened parallelepiped shape; a heat exchanger housed inside said casing; and a first fan and a second fan, which have respective intake and delivery sections and are arranged for generating, respectively, a first airflow directed from the inside to the outside and a second airflow directed from the outside to the inside, where the first and second airflows are in a relationship of mutual heat exchange in said heat exchanger.

7 Claims, 10 Drawing Sheets

AIR-EXCHANGE DEVICE FOR BUILDINGS

CROSS-REFERENCE TO RELATED APPLICATIONS

This application claims benefit of Italian patent application number TO2010A000093, filed Feb. 10, 2010, which is herein incorporated by reference.

BACKGROUND OF THE INVENTION

1. Field of the Invention

The present invention regards an air-exchange device for buildings, comprising a casing, which has a flattened parallelepipedal shape and contains a heat exchanger, operating in counter-current, a first fan for generating a first airflow directed from the internal environment to the external environment, and a second fan for generating a second airflow directed from the external environment to the internal environment, in which the two airflows are set in a relationship of mutual heat exchange through said heat exchanger.

The present invention has been developed in particular in order to provide an air-exchange device that can be used instead of windowsills of a conventional type.

2. Description of the Related Art

The document No. WO2005/038355 describes an air-exchange device for buildings that can be used instead of a windowsill of a conventional type. This known device comprises a casing having a flattened parallelepipedal shape set between the external environment and the internal environment. Set inside the casing is a heat exchanger, passing through which is a first airflow directed from the inside to the outside and a second airflow directed from the outside to the inside. The airflows are generated by respective fans housed within the casing.

SUMMARY OF THE INVENTION

The object of the present invention is to provide an air-exchange device of the type indicated above having a structure and an arrangement of the components that will enable optimal exploitation of the spaces and optimization of the recovery of energy.

According to the present invention, the above object is achieved by an air-exchange device having the characteristics that form the subject of claim 1.

The claims form an integral part of the teaching provided herein in relation to the invention.

BRIEF DESCRIPTION OF THE DRAWINGS

The present invention will now be described in detail with reference to the attached drawings, which are provided purely by way of non-limiting example, and in which.

DETAILED DESCRIPTION

Figures 1, 2:
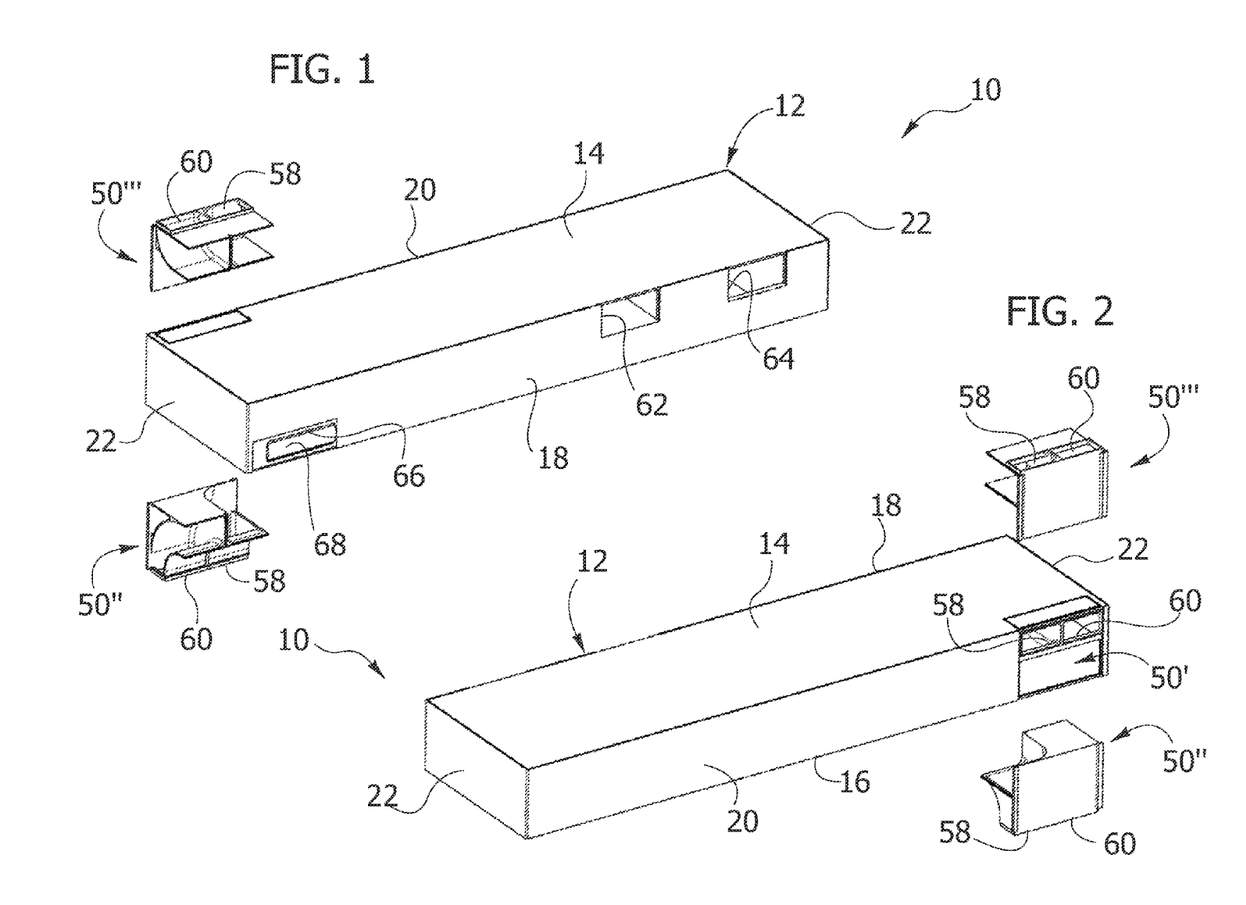
FIGS. 1 and 2 are perspective views from different angles of an air-exchange device according to the present invention.
Figure 3:
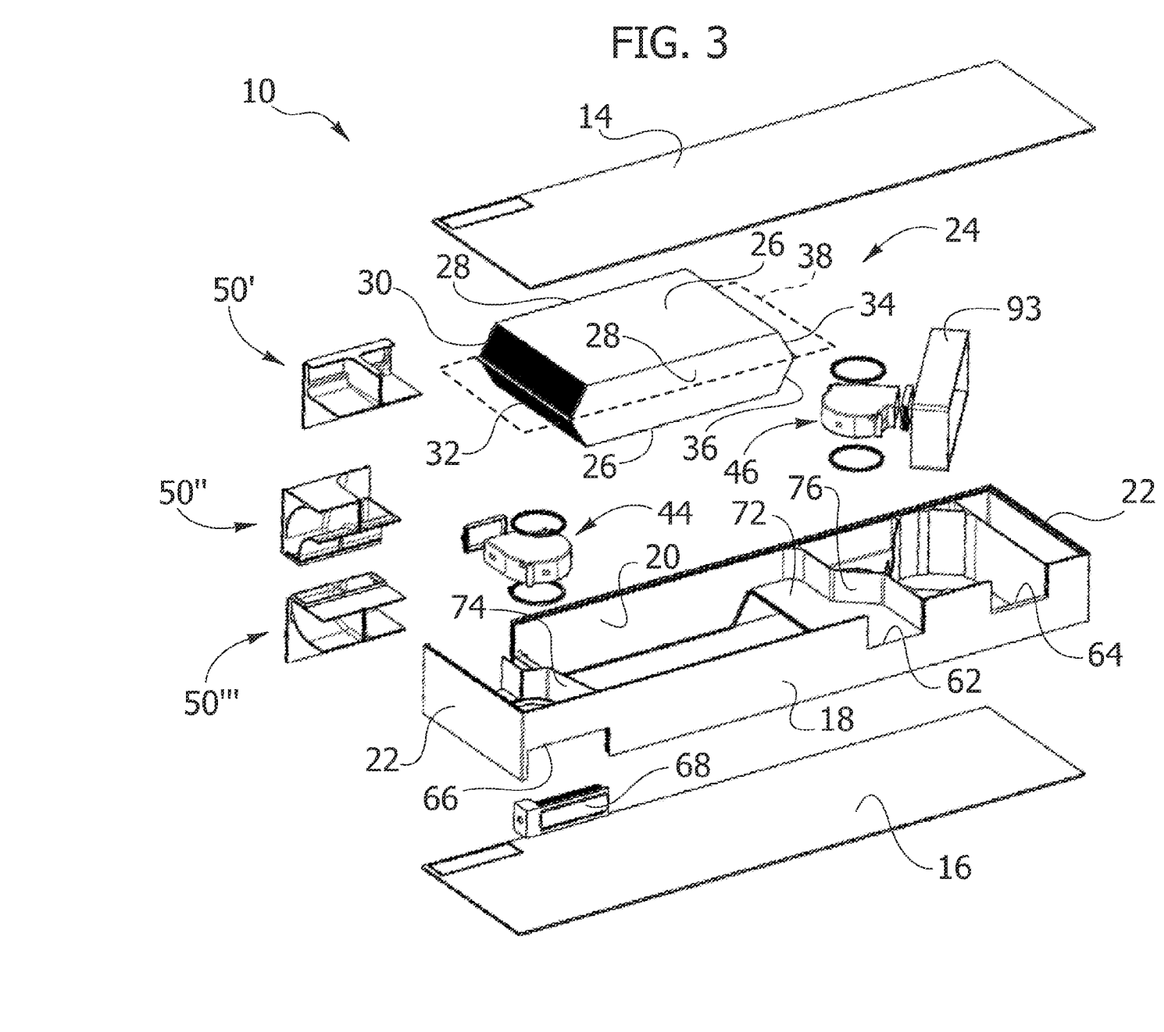
FIG. 3 is an exploded perspective view of the air-exchange device according to the present invention.

With reference to FIGS. 1 to 3, designated by 10 is an air-exchange device for buildings, designed to be installed in a wall of a building that separates an internal environment from an external environment. The device 10 is configured with a shape such that it can be installed instead of a windowsill of a conventional type. The use of the device 10 with sill function is not, however, imperative. The air-exchange device 10 according to the present invention may also be installed above the top edge or along a vertical edge of a window or door or in any one other point of an external wall of a building.

The device 10 comprises a casing 12 having a flattened parallelepipedal shape. The casing 12 comprises two main walls 14, 16 parallel to one another, an inner front wall 18, an outer front wall 20, and two side walls 22. As is illustrated in FIG. 3, the walls 18, 20 and 22 preferably form a quadrangular perimetral frame, and the main walls 14, 16 form two lids applied on opposite sides to the perimetral frame. In the sequel of the description, the two walls 14, 16 will be designated respectively as top wall 14 and bottom wall 16. The terms "top" and "bottom" refer to the case in which the air-exchange device 10 is mounted in a horizontal position.

Housed inside the casing 12 is a heat exchanger 24 operating in counter-current. The heat exchanger 24 has two main surfaces 26 parallel to one another and two front surfaces 28, which are also parallel to one another. The heat exchanger 24 has on a first side a first inlet 30 and a first outlet 32 and, on a second side opposite to the first, a second inlet 34 and a second outlet 36. The first inlet 30 communicates with the second outlet 36, and the second inlet 34 communicates with the first outlet 32. The heat exchanger 34 is preferably formed by a plurality of ribbed sheets of plastic material, which are set alongside one another and form a first array of flow channels that join the first inlet 30 and the second outlet 36 and a second array of flow channels that join the second inlet 34 and the first outlet 32.

The heat exchanger 24 has a median plane of symmetry 38. The first inlet 30 is set on the opposite side of the median plane 38 with respect to the first outlet 32. Likewise, the second inlet 34 is set on the opposite side of the median plane 38 with respect to the second outlet 36. The first inlet 30 and the second inlet 34 are set on the same side of the median plane 38 and, likewise, the first outlet 32 and the second outlet 36 are set on the same side of the median plane 38.

The height of the heat exchanger 24 (equal to the distance between the main surfaces 26) is substantially equal to the distance between the main walls 14, 16 of the casing 12. The distance between the front walls 28 of the heat exchanger 24 is substantially equal to the distance between the inner front wall 18 and the outer front wall 20 of the casing 12. The inlets 30, 34 and the outlets 32, 36 of the heat exchanger preferably have a width equal to the distance between the front surfaces 28.

Figure 4:
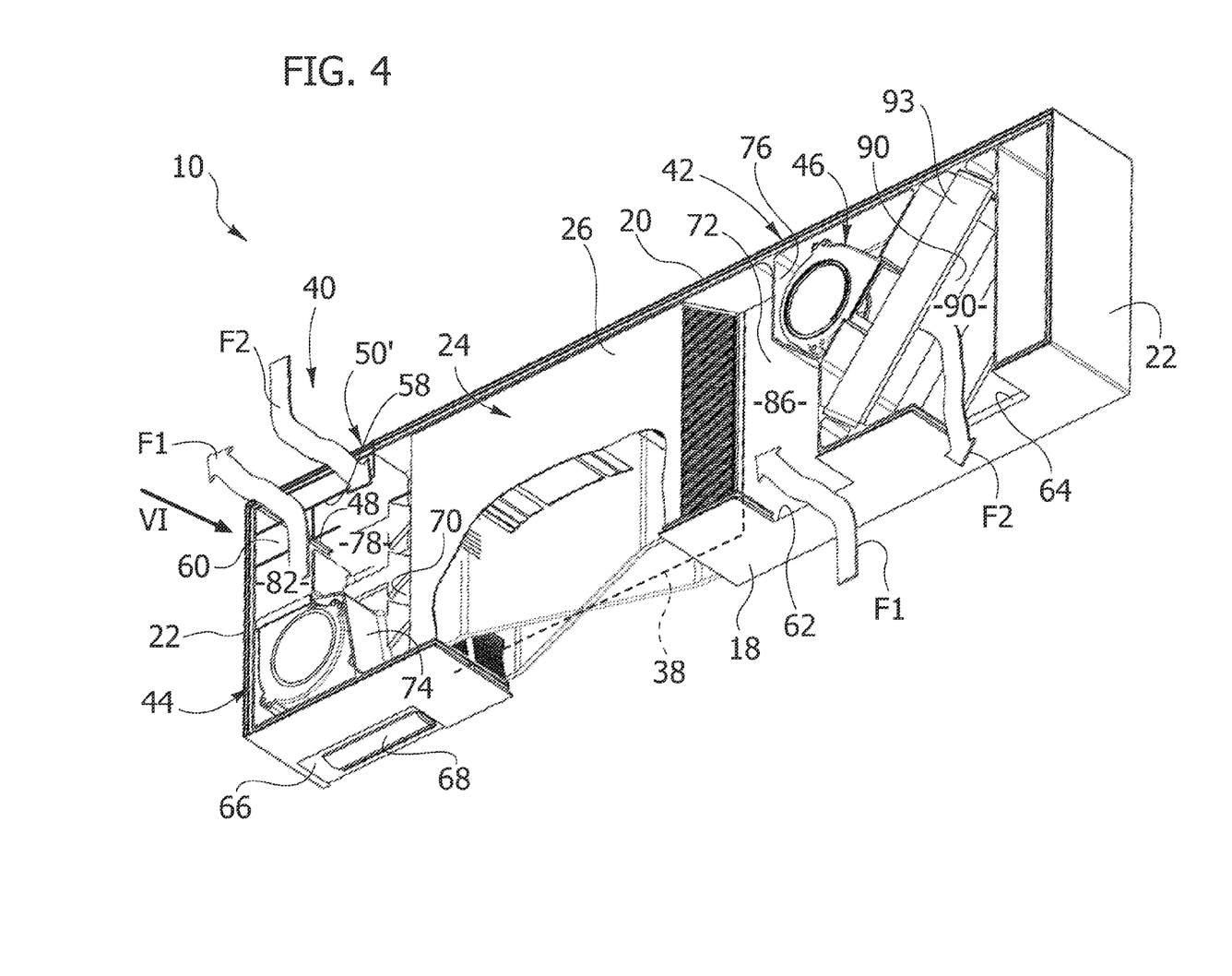
FIGS. 4 and 5 are partially sectioned perspective views from different angles of the air-exchange device according to the invention.
Figure 5:
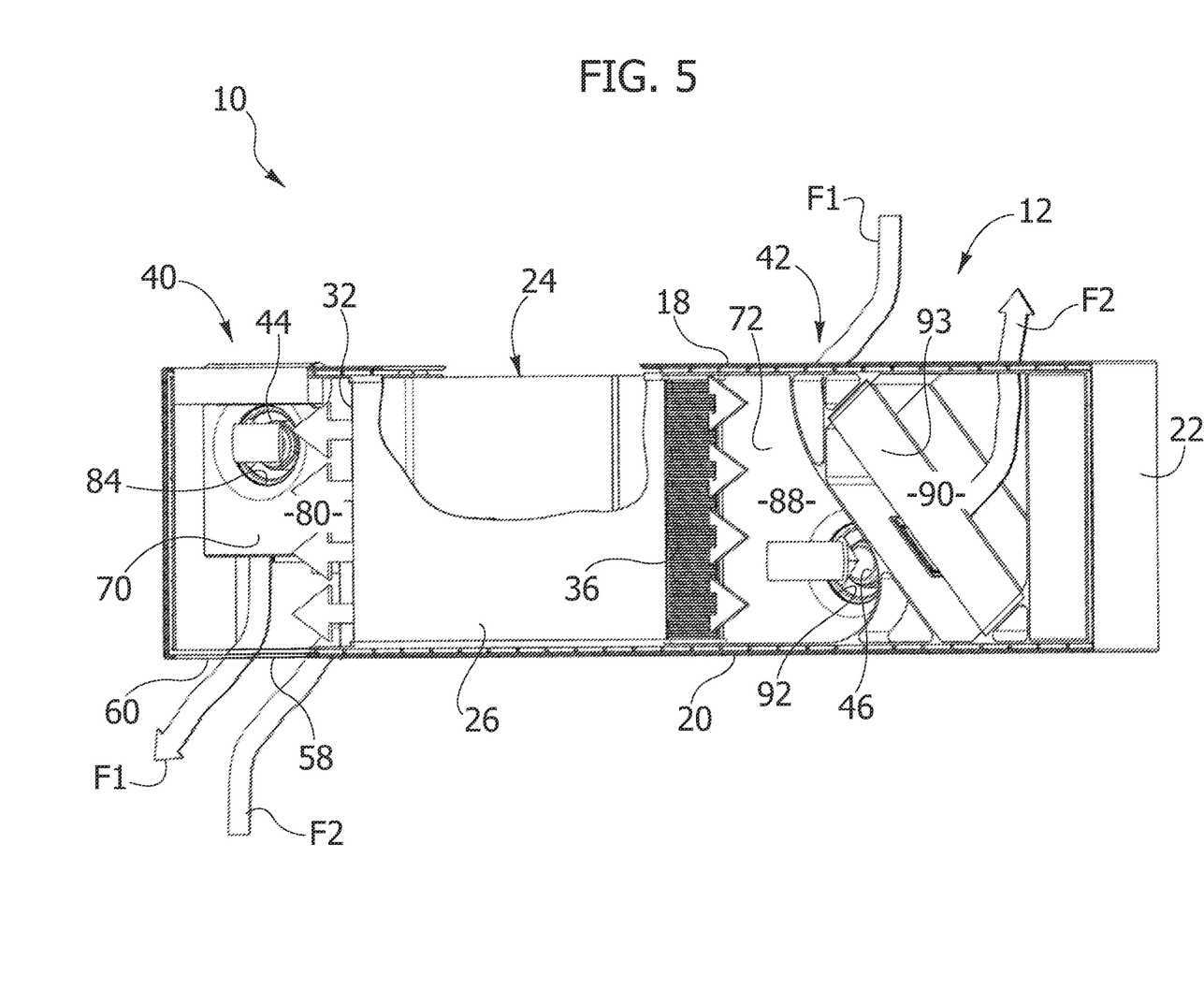

With reference to FIGS. 4 and 5, the casing 12 comprises a first casing section 40 and a second casing section 42. The first and second casing sections 40, 42 are separated from one another by the heat exchanger 24. Housed in the first casing section 40 is a first electric fan 44, and housed in the second casing section 42 is a second electric fan 46. The electric fans 44, 46 are of a centrifugal type and have respective fans rotatable about axes orthogonal with respect to the main walls 14, 16 of the casing 12. Each electric motor 44, 46 has an intake section sharing the axis of rotation and a delivery section oriented tangential with respect to the axis of rotation. The electric fans 44, 46 are characterized by a small axial thickness, equal to or less than half the height of the casing 12. The electric fans 44, 46 are not described in greater detail in so far as they are of a commercially available type. For example, a model of fan suitable for use in the device according to the present invention is the fan Sanyo San Ace B160. It is in any case understood that any other type of fan with the same characteristics may be used.

Figure 8:
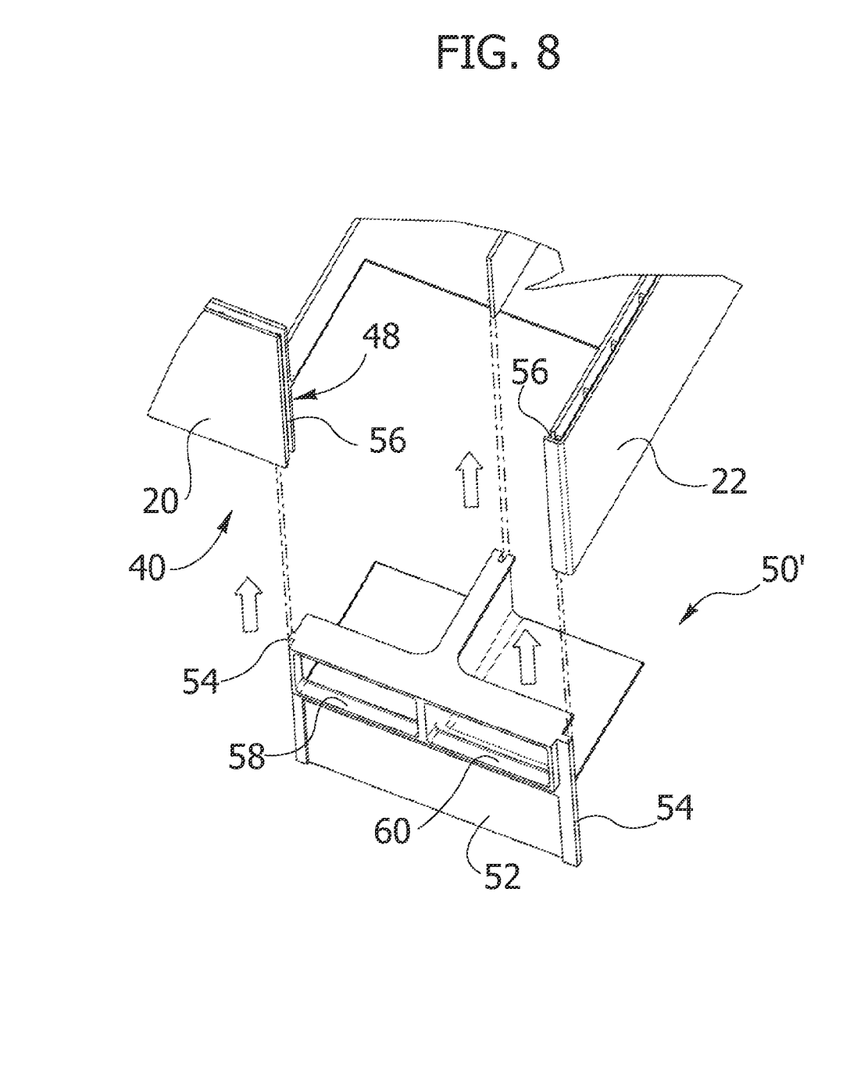
FIGS. 8 and 9 are perspective views illustrating the installation of the flow-deflector element of FIG. 7.
Figure 9:
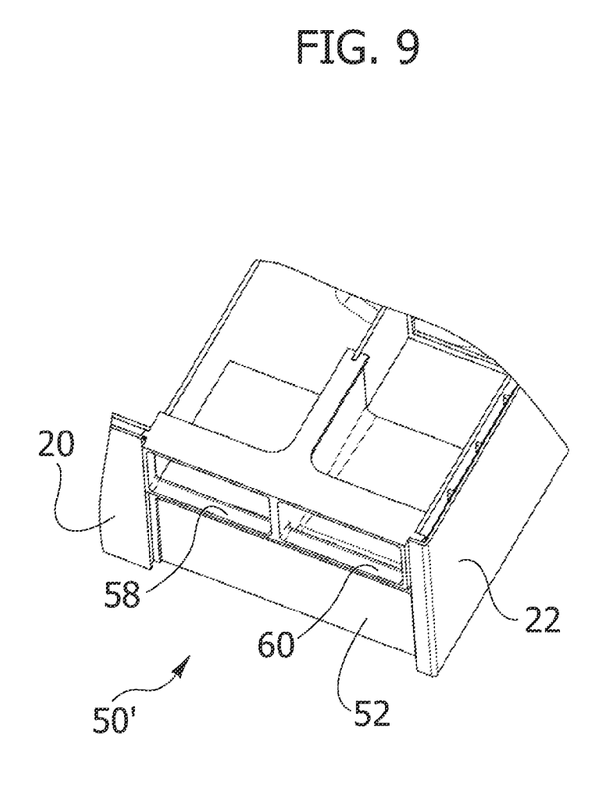
Figure 10:
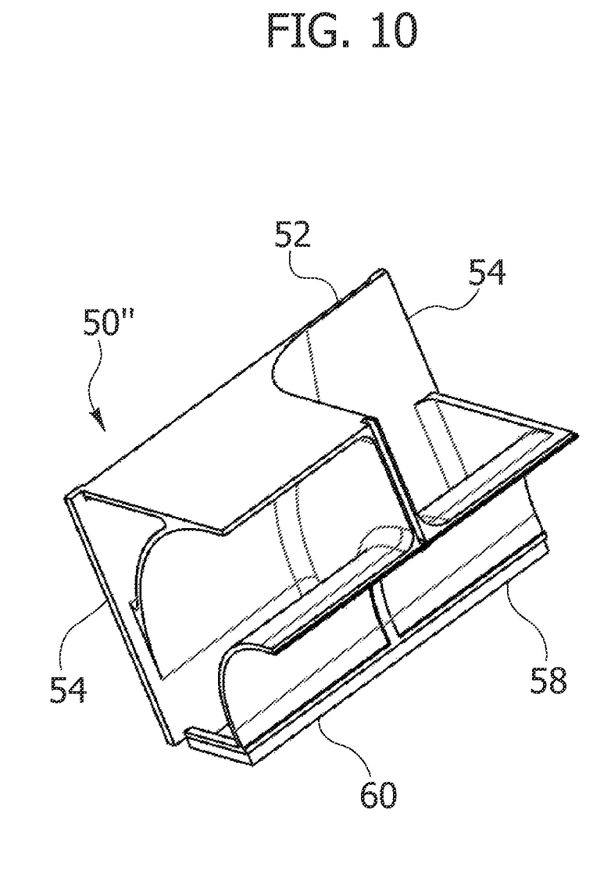
FIGS. 10 and 11 are perspective views illustrating alternative embodiments of the flow-deflector element.
Figure 11:
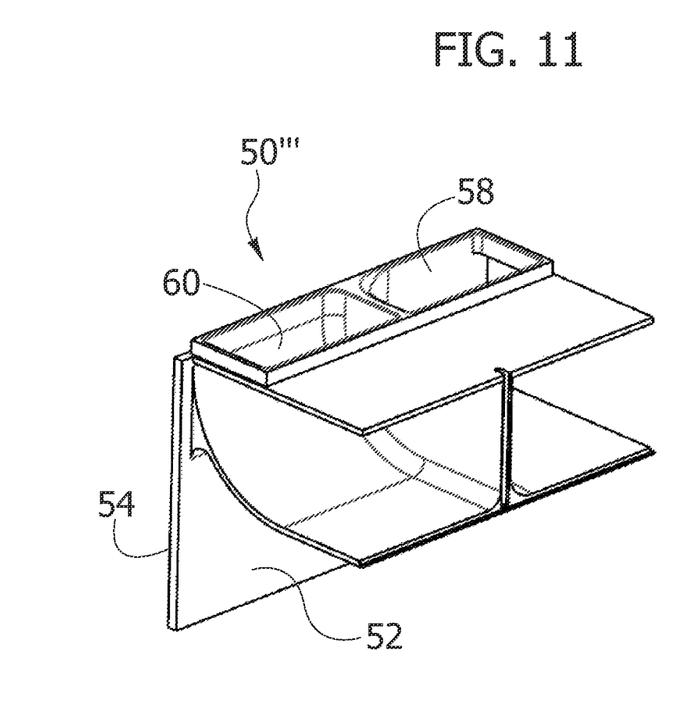

The outer front wall 20 of the casing 12 has a window 48 open in an area corresponding to the first casing section 40. A flow-deflector element 50' or 50" or 50'" is applied to the window 48 as illustrated in FIGS. 8 and 9. The flow-deflector element 50' has a front wall 52 having two side ribbings 54 that engage corresponding grooves 56 formed along the facing edges of the window 48. The flow-deflector element 50' has an internal inlet opening 58 and an external inlet opening 60. The openings 58 and 60 of the flow-deflector element 50' are oriented frontally with respect to the outer front wall 20. In the window 48 of the casing 12 there can be mounted flow-deflector elements 50" or 50'" (illustrated, respectively, in FIGS. 10 and 11) instead of the deflector element 50'. In the case of the flow-deflector element 50", the openings 58 and 60 are oriented downwards (the axes of the openings 58, 60 are orthogonal to the bottom main wall 16). In the case of the flow-deflector element 50'", the openings 58, 60 are oriented upwards (the axes of the openings 58, 60 are orthogonal to the top main wall 14).

With reference to FIGS. 1 and 4, the casing 12 is provided with an internal inlet opening 62 and an internal outlet opening 64, which are formed in the inner front wall 18 in an area corresponding to the second casing section 42. The inner front wall 18 can also be provided with a bypass opening 66, set in a position corresponding to the first casing section 40 and closed by an openable hatch 68.

Figure 6:
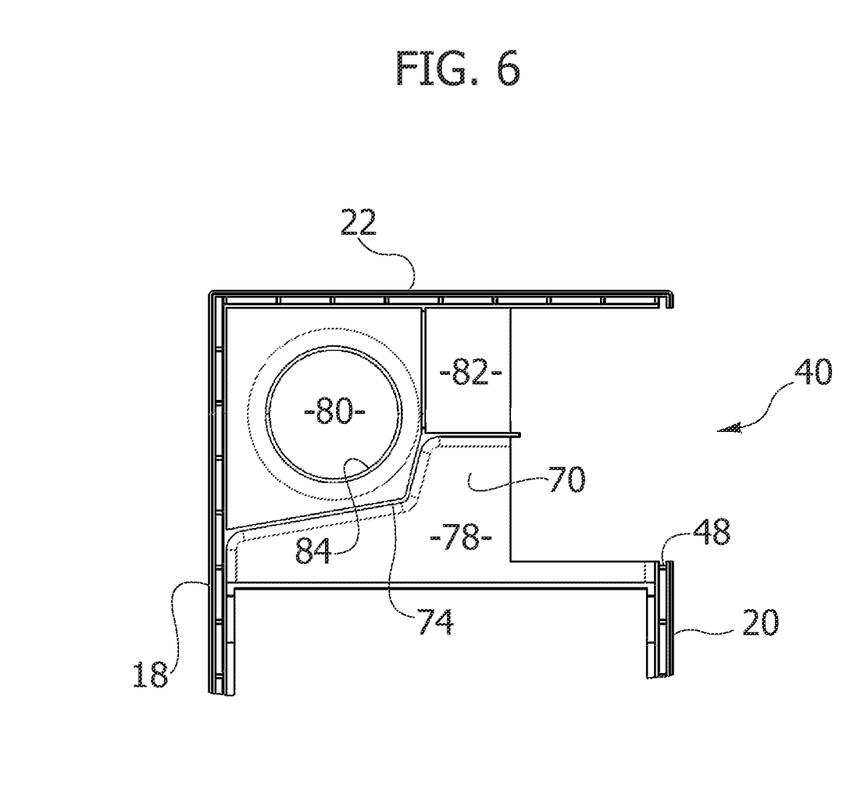
FIG. 6 is a plan view of the part indicated by the arrow VI in FIG. 4.
Figure 7:
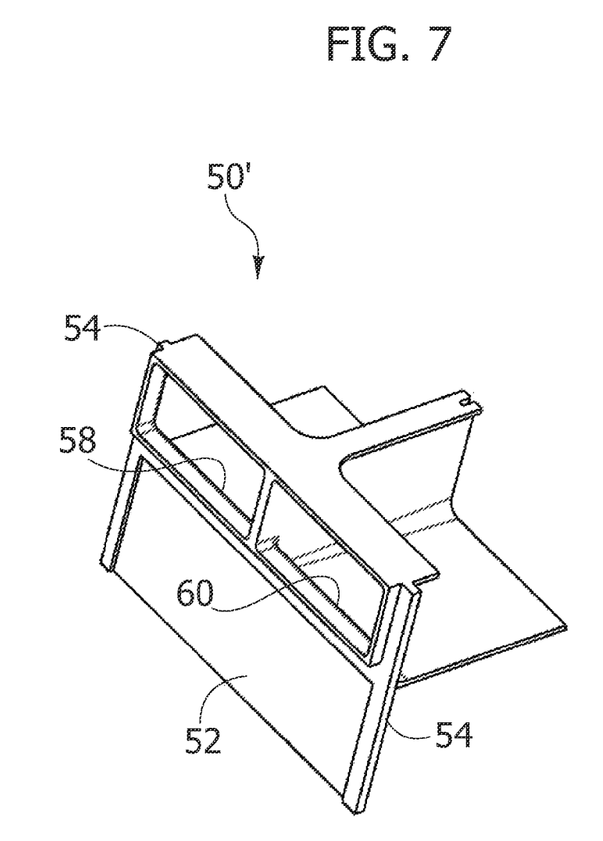
FIG. 7 is a perspective view of a flow-deflector element.

With reference to FIGS. 4, 5 and 6, the first and second casing sections 40, 42 comprise, respectively, a first partition wall 70 and a second partition wall 72, which are aligned to the median plane 38 of the heat exchanger 24. The partition walls 70, 72 are preferably parallel to the main walls 14, 16 and are set at the same distance from the main walls 14, 16.

The casing sections 40, 42 further comprise, respectively, a third partition wall 74 and a fourth partition wall 76, each of which extends between the respective partition wall 70, 72 and the top main wall 14.

The partition walls 70, 74 of the first casing section 40, together with the outer walls of the casing 12, define:

a first chamber 78, communicating with the first inlet 30 of the heat exchanger 24 and with the external inlet opening 58;

a second chamber 80, communicating with the first outlet 32 of the heat exchanger 24 and with the intake section of the first fan 44; and a third chamber 82, communicating with the delivery section of the first fan 44 and with the external outlet opening 60.

As may be seen in FIGS. 5 and 6, formed in the first partition wall 70 is an opening 84, which sets the intake section of the first fan 44 in communication with the second chamber 80.

The partition walls 72, 76 of the second casing section 42, together with the outer walls of the casing 12, define:

a fourth chamber 86, communicating with the second inlet 34 of the heat exchanger 24 and with the internal inlet opening 62;

a fifth chamber 88, communicating with the second outlet 36 of the heat exchanger 24 and with the intake section of the second fan 46; and a sixth chamber 90, communicating with the delivery section of the second fan 46 and with the internal outlet opening 64.

As may be seen in FIG. 5, formed in the second partition wall 72 is an opening 92, which sets the intake section of the second fan 46 in communication with the fifth chamber 88. Preferably housed in the sixth chamber 90 is a filter 93.

In operation, the first fan 24 generates a first airflow F1 that enters the fourth chamber 86 through the internal inlet opening 62, enters the heat exchanger 24 through the second inlet 34, exits from the heat exchanger 24 through the first outlet 32, enters the second chamber 80, passes through the first fan 24, traverses the third chamber 82, and exits into the external environment through the external outlet opening 60.

The second fan 46 generates a second airflow F2, which enters the first chamber 78 through the external inlet opening 58, enters the heat exchanger 24 through the first inlet 30, exits from the heat exchanger 24 through the second outlet 36, enters the fifth chamber 88, traverses the second fan 46, traverses the sixth chamber 90, and exits into the internal environment through the internal outlet opening 64. The airflows F1 and F2 are in a relationship of mutual heat exchange within the heat exchanger 24.

Figure 12:
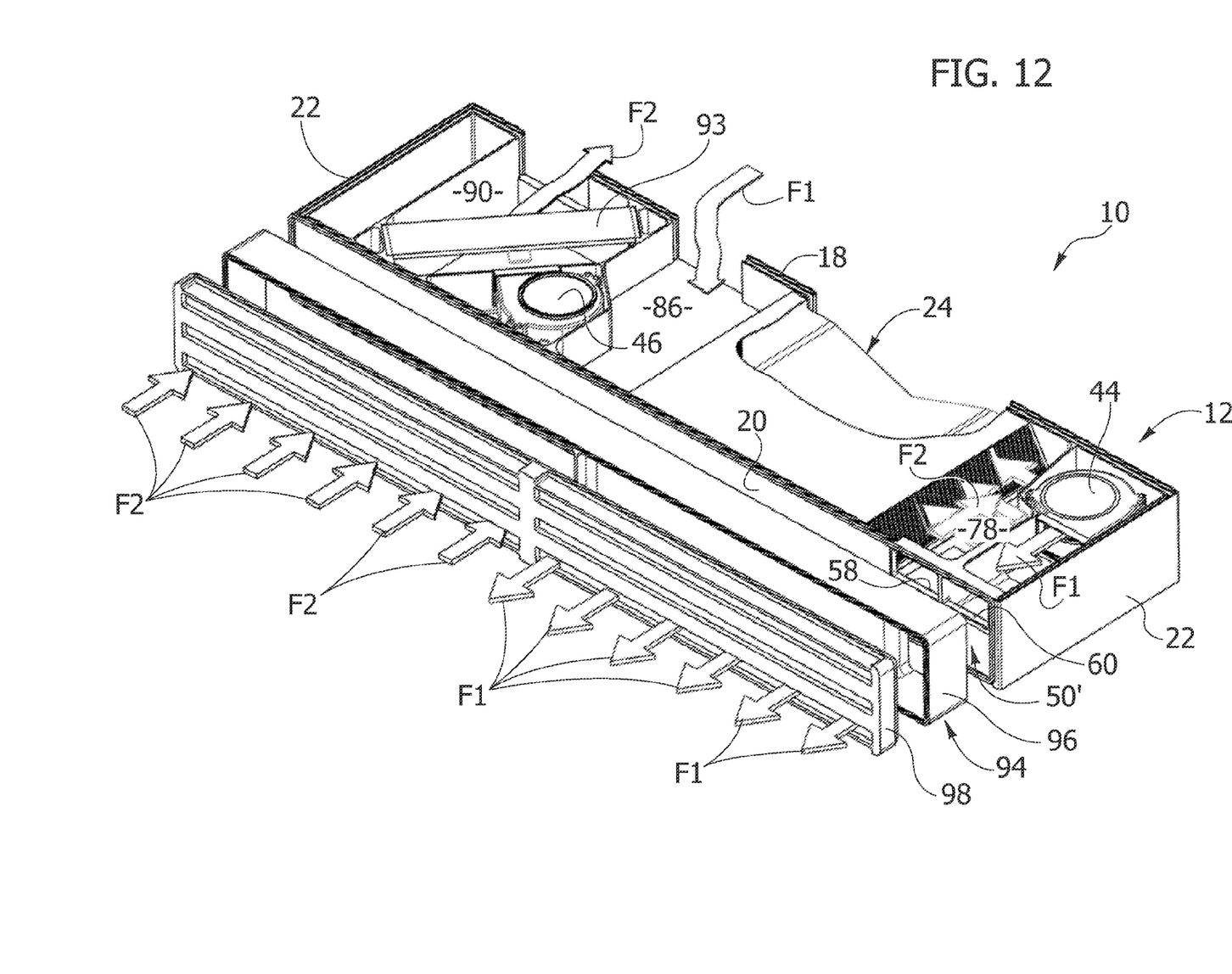
FIGS. 12, 13, and 14 are partially exploded perspective views illustrating the air-exchange device according to the present invention provided with a conveyor of airflows on the external side.

The flow-deflector elements 50', 50" and 50'" are interchangeable. The use of a different flow-deflector element 50' or 50" or 50'" enables variation of the direction of the airflows F1 and F2 on the external side of the air-exchange device 10. FIG. 12 shows an air-exchange device 10 having a flow-deflector element 50', FIG. 13 shows the air-exchange device 10 with a flow-deflector element 50", and FIG. 14 shows the air-exchange device 10 with a flow-deflector element 50'".

Figure 13:
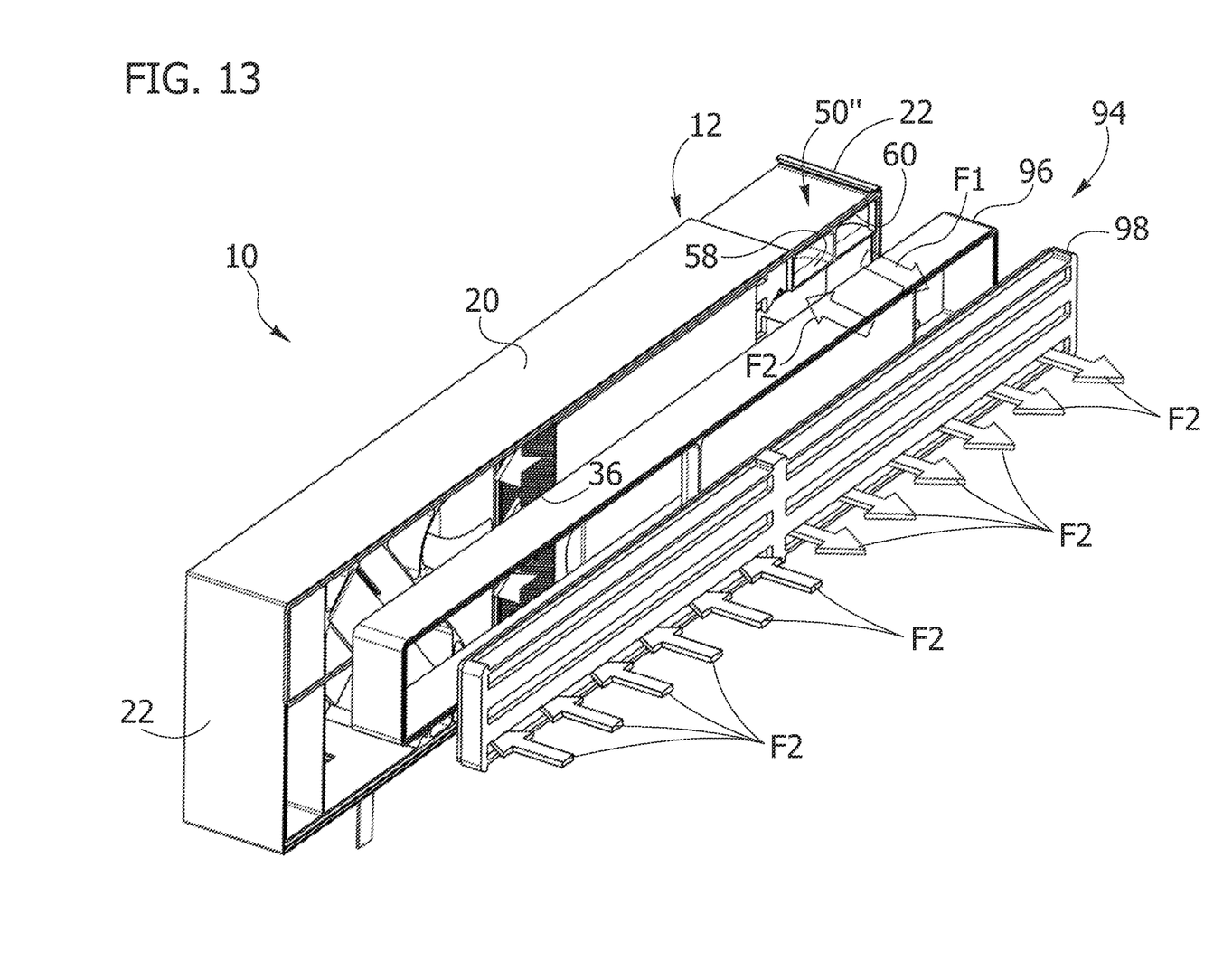
Figure 14:
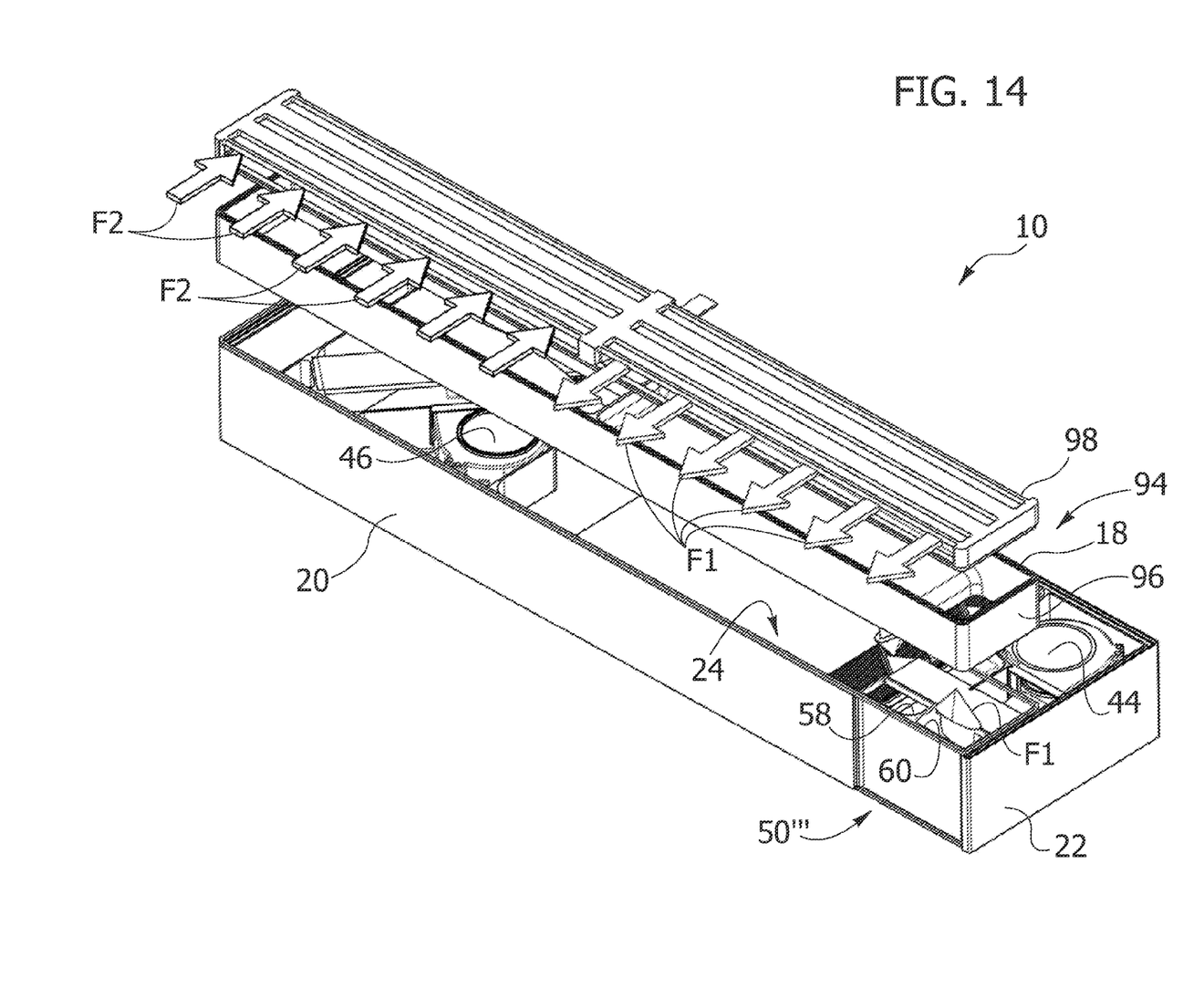

As illustrated in FIGS. 12-14, the air-exchange device 10 can be provided with an external air conveyor 94. The external air conveyor 94 can be applied indifferently on the outer front wall 20 (FIG. 12), on the bottom main wall 16 (FIG. 13), or on the top main wall (FIG. 14), according to which flow-deflector element 50', 50" or 50'" is used. The external conveyor 94 has a frame 96 and a diffuser element 98, which is provided with at least one slit for inlet and outlet of the airflows with various orientation (front as in FIGS. 12 and 13 or lateral as in FIG. 14). The flow-deflector elements 50', 50" and 50'" and the external conveyor 94 enable the maximum versatility to be achieved as regards the orientation of the external flows of air at inlet to and at outlet from the air-exchange device 10. These components enable adaptation of the air-exchange device 10 to the various applications without the need to modify the structure of the air-exchange device.

While the foregoing is directed to embodiments of the present invention, other and further embodiments of the invention may be devised without departing from the basic scope thereof, and the scope thereof is determined by the claims that follow.

The invention claimed is:

1. An air-exchange device for buildings, designed to be installed between an internal environment and an external environment, comprising:

a casing having a flattened parallelepipedal shape with two main walls parallel to one another, an inner front wall and an outer front wall, the casing having an internal inlet opening, an internal outlet opening, an external inlet opening and an external outlet opening;

a heat exchanger housed inside said casing, the heat exchanger having a first inlet and a first outlet, which are arranged on a first side, and a second inlet and a second outlet, which are arranged on a second side, where the first inlet communicates with the second outlet and the second inlet communicates with the first outlet; and a first fan and a second fan which have respective intake and delivery sections and are arranged for generating, respectively, a first airflow directed from the internal inlet opening to the external outlet opening and a second airflow directed from the external inlet opening to the internal outlet opening, where the first and second airflows are in a relationship of mutual heat exchange in said heat exchanger, wherein the heat exchanger has a median plane parallel to said main walls of the casing, where the first inlet is on the opposite side of the median plane with respect to the first outlet and the second inlet is on the opposite side of the median plane with respect to the second outlet;

the heat exchanger separates from one another a first casing section set in which is said first fan and a second casing section set in which is said second fan;

said first casing section comprises a first chamber communicating with the first inlet of the heat exchanger and with the external inlet opening, a second chamber communicating with the first outlet of the heat exchanger and with the intake section of the first fan, and a third chamber communicating with the delivery section of the first fan and with the external outlet opening;

said second casing section comprises a fourth chamber communicating with the second inlet of the heat exchanger and with the internal inlet opening, a fifth chamber communicating with the second outlet of the heat exchanger and with the intake section of the second fan, and a sixth chamber communicating with the delivery section of the second fan and with the internal outlet opening; and the first casing section and the second casing section comprise, respectively, a first partition wall and a second partition wall, which are coplanar with said median plane of the heat exchanger, where said partition walls are provided with respective openings that set said second chamber and said fifth chamber in communication with the respective intake sections of the first fan and of the second fan.

2. The air-exchange device according to claim 1, wherein the external inlet opening and the external outlet opening are formed in a flow-deflector element mounted in a removable way in a window of the outer front wall of the casing.

3. The air-exchange device according to claim 2, wherein said flow-deflector element is arranged so as to orient the airflows through the external inlet opening and through the external outlet opening in a direction orthogonal to said outer front wall.

4. The air-exchange device according to claim 2, wherein said flow-deflector element is arranged so as to orient the airflows through said external inlet opening and through said external outlet opening in a direction orthogonal to one of said main walls.

5. The air-exchange device according to claim 1, comprising an external conveyor mounted on said casing and associated to said external inlet opening and to said external outlet opening.

6. The air-exchange device according to claim 1, wherein said fans are centrifugal fans with axial intake section and tangential delivery section, each of said fans being set between the respective partition wall and one of said main walls.

7. The air-exchange device according to claim 1, wherein said heat exchanger has two main surfaces parallel and adjacent to the main walls of the casing, and two front walls parallel and adjacent to the inner front wall and to the outer front wall, respectively.

* * * * *